US012683218B2

(12) United States Patent
Kellner et al.

(10) Patent No.: US 12,683,218 B2
(45) Date of Patent: Jul. 14, 2026

(54) BATTERY DEVICE FOR GUIDED COOLING OF BATTERY CELLS AND A POWER BUS

(71) Applicant: Dr. Ing. h.c. F. Porsche Aktiengesellschaft, Stuttgart (DE)

(72) Inventors: Philipp Kellner, Renningen-Malmsheim (DE); Christopher Volkmer, Niefern-Öschelbronn (DE); Markus Göhring, Nufringen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 600 days.

(21) Appl. No.: 18/123,465

(22) Filed: Mar. 20, 2023

(65) Prior Publication Data

US 2023/0327234 A1 Oct. 12, 2023

(30) Foreign Application Priority Data

Apr. 12, 2022 (DE) ..................... 10 2022 108 833.2

(51) Int. Cl.
H01M 10/613 (2014.01)
H01M 10/6568 (2014.01)
H01M 50/209 (2021.01)

(52) U.S. Cl.
CPC ..... H01M 10/6568 (2015.04); H01M 10/613 (2015.04); H01M 50/209 (2021.01)

(58) Field of Classification Search
CPC ........... H01M 10/6568; H01M 10/613; H01M 50/209
See application file for complete search history.

(56) References Cited

U.S. PATENT DOCUMENTS

| | | | |
|---|---|---|---|
| 10,003,112 B1 * | 6/2018 | Boor | ....................... B60L 58/26 |
| 2009/0274952 A1 * | 11/2009 | Wood | ................ H01M 10/6566 429/185 |
| 2021/0344071 A1 | 11/2021 | Aktas et al. | |
| 2022/0336886 A1 | 10/2022 | Kellner et al. | |

FOREIGN PATENT DOCUMENTS

| | | |
|---|---|---|
| DE | 102020205423 A1 | 11/2021 |
| DE | 102021109353 A1 | 3/2022 |
| JP | 2000067843 A | 3/2000 |

* cited by examiner

*Primary Examiner* — Osei K Amponsah
(74) *Attorney, Agent, or Firm* — Buchanan Ingersoll & Rooney PC

(57) ABSTRACT

A battery device for a motor vehicle, in particular an electric motor vehicle, having at least two battery cells and a power bus, which are arranged in an interior of a battery housing and can be temperature-controlled by a flowable coolant arranged in the interior. In an intermediate space between the battery cells, the power bus and a deflector element are arranged, wherein the deflector element includes at least one passage opening for the coolant, which passage opening is arranged in such a way that coolant flowing through the passage opening flows along the power bus.

20 Claims, 3 Drawing Sheets

BATTERY DEVICE FOR GUIDED COOLING OF BATTERY CELLS AND A POWER BUS

CROSS-REFERENCE TO RELATED APPLICATION

This application claims priority to German Patent Application No. 10 2022 108 833.2, filed Apr. 12, 2022, the content of such application being incorporated by reference herein in its entirety.

FIELD OF THE INVENTION

The invention relates to a battery device having a deflector element for targeted cooling of the battery cells and a power bus within the battery housing. The invention further relates to a method for operating a battery device having a deflector element for targeted cooling of the battery cells and a power bus within the battery housing.

BACKGROUND OF THE INVENTION

To provide electrical energy, large battery modules with numerous battery cells are often installed in motor vehicles, in particular electric vehicles. Due to low design space, with simultaneously increasing requirements for the stored amount of energy in motor vehicles, the battery cells are arranged closely together. Depending on the discharging or charging rate, the battery module and the battery cells are thermally loaded. This thermal load negatively affects the range of a motor vehicle and the durability of the individual battery cells. In particular, battery cells arranged adjacent one another, which often have little or no distance to the respective adjacent battery cell, can only insufficiently dissipate the resulting heat loss. Moreover, there is also a significant power dissipation in the power buses electrically connecting the battery cells, which is converted into heat.

SUMMARY OF THE INVENTION

In light of this situation, one problem addressed by the invention is to enable an efficient cooling of the battery cells and power bars within a battery module.

The problem may be addressed by a battery device for a motor vehicle, in particular an electric motor vehicle, having at least two battery cells and a power bus, which are arranged in an interior of a battery housing and can be temperature-controlled by a flowable coolant arranged in the interior, characterized in that, in an intermediate space between the battery cells, the power bus and a deflector element are arranged, wherein the deflector element comprises at least one passage opening for the coolant, which passage opening is arranged in such a way that coolant flowing through the passage opening flows along the power bus.

The problem is further solved by a method for operating a battery device of a motor vehicle, in particular an electric motor vehicle, having at least two battery cells and a power bus, which are arranged in an interior of a battery housing and are temperature-controlled by a flowable coolant arranged in the interior, characterized in that characterized in that, in an intermediate space between the battery cells, the power bus and a deflector element are arranged, wherein the deflector element comprises at least one passage opening, wherein the coolant flows along the power bus and through the passage opening.

The battery device according to aspects of the invention comprises at least two battery cells, a power bus, and a deflector element. The power bus and the deflector element are arranged in an intermediate space between the two battery cells. During operation of the battery device, the battery cells arranged in the interior of the battery housing and the power bus are temperature-controlled by a coolant. The deflector element directs the coolant flow through the passage opening in such a way that the coolant also flows along the power bus starting from one of the two battery cells and thereby also temperature-controls the power bus.

Preferably, the battery cells are mechanically connected to the power bus via an electrically conductive connection.

According to an advantageous configuration, it is provided that a perfusable free region for the flowable coolant is arranged below and above the battery cells. The coolant can cool down both the downward and upward facing surfaces of the battery cells while flowing through these free regions below and above the battery cells.

According to an advantageous configuration, it is provided that the deflector element is arranged in such a way that a U-shaped flow path of the coolant is created in the intermediate space, in particular around the power bus. Such a configuration has the advantage that a power bus arranged within the intermediate space at a distance from the top and/or bottom of the battery cell can receive a flow via the U-shaped flow path of the coolant. In this respect, for example, the coolant can be directed downward from a top of a first battery cell towards the power bus, through the passage opening in the deflector element, and then upward towards the top of a second battery cell opposite the first battery cell.

According to an advantageous configuration, it is provided that the passage opening is arranged below the power bus. By arranging the passage opening below the power bus, a flow path of the coolant can be produced, which passes by the power bus from above and then bends below the power bus in order to flow through the passage opening. On the other side of the deflector element, the flow path of the coolant can then bend upward again.

According to an advantageous configuration, it is provided that the deflector element comprises several passage openings, wherein all passage openings are arranged at a common distance from a top of the deflector element. The several passage openings can create several regions in which the coolant is guided along the power bus. Preferably, the passage openings are arranged in a region below the power bus so that the coolant flow coming from above is directed along the power bus before passing through the passage openings. Alternatively, it can be provided that the passage openings are arranged at different distances from the top side of the deflector element.

According to an advantageous configuration, it is provided that the passage opening has a circular or elliptical or polygonal, preferably quadrilateral, cross-section. If several passage openings are provided in the deflector element, they are preferably configured with an identical cross-section. By selecting the cross-section, the flow path in the region of the power bus can be adjusted. In particular, by selecting the region size of the cross-section, the flow rate along the power bus and the battery cell can be adjusted.

According to an advantageous configuration, it is provided that the coolant is guided above the battery cells in a first flow direction, wherein the deflector element is arranged perpendicular to the first flow direction; and/or in that the coolant is guided below the battery cells in a second flow direction, wherein the deflector element is arranged perpendicular to the second flow direction. This arrangement allows for the targeted redirection of the flow direction. For the cooling, a cold coolant can first pass above or below the battery cells while absorbing heat from the battery cells. The coolant preheated in this way then passes through the deflector element past the power bus so that it can also be cooled. In this way, the battery cell arranged upstream of the power bus can be cooled at a higher cooling capacity than the power bus. The deflector element can extend over the internal width of the battery device in order to deflect the entire flow of coolant.

According to an advantageous configuration, it is provided that the power bus interconnects several battery cells. The power bus establishes the connection between poles of at least two battery cells. For example, the power bus can connect like poles of at least two battery cells connected in parallel. Alternatively, the power bus can connect different poles of serially connected battery cells to one another.

According to an advantageous configuration, it is provided that the deflector element is sealed against an inner wall and the battery housing above and/or below. Ann undesirable flow around the deflector element at its top and bottom can be prevented by the sealing. The flow of coolant can be diverted by the sealing entirely along the length of the deflector element in the direction of the passage opening in the deflector element.

According to an advantageous configuration, a conveyor device for conveying the coolant in a flow direction is provided. The conveyor device can generate pressure in order to convey the coolant through the battery device. Preferably, the battery device further comprises a heat exchanger that allows a heat exchange between the coolant and the environment or another coolant. The conveyor device preferably also conveys the coolant through the heat exchanger.

According to an advantageous configuration, it is provided that at least a first of the at least two battery cells is arranged on a first side of the deflector element and one at least a second of the at least two battery cells is arranged on a second side of the deflector element opposite the first side. For example, the first battery cell can be arranged closer to a coolant inlet of the battery device. The deflector element spatially separates the first battery cell from the second battery cell, wherein only the passage opening comprises a passageway for the coolant. In this respect, the second battery cell is positioned on the opposite side of the deflector element. Preferably, the battery device comprises several first and/or second battery cells. The first battery cells are located on a first side of the deflector element, and the second battery cells are located on a second side of the deflector element opposite the first side.

According to an advantageous configuration, it is provided that the battery device comprises at least two first and/or at least two second battery cells, wherein, between two first and two second battery cells, a cell intermediate channel is arranged, which connects a perfusable free region below the respective battery cells to a perfusable free region above the battery cells. Such a configuration enables a flow path of the coolant in which the coolant flows through a free, perfusable region below the first battery cells, then upwards through the cell intermediate channels present between the first battery cells and through the free, perfusable regions above the first battery cells, towards the deflector element. The cell intermediate channels can be arranged in a meandering fashion so that the cooling capacity is maximized along the outer sides of the battery cells. The free region above the battery cells can be divided by the deflector element in such a way that a free upper region above the first and another region above the second battery cells is created.

According to an advantageous configuration, it is provided that the coolant is a dielectric fluid. The dielectric fluid can be a weakly electrically conductive or non-electrically conductive coolant fluid. The dielectric fluid can prevent an electrical breakdown or short circuit between battery cells and can thus increase the longevity of the battery module.

According to an advantageous configuration of the method described above, it is provided that at least a first of the at least two battery cells is arranged on a first side of the deflector element, and at least a second of the at least two battery cells is arranged on a second side of the deflector element opposite the first side, wherein the coolant flows in through a coolant inlet below the first and/or second battery cells and flows upwards through at least one cell intermediate channel between two first and/or second battery cells. The coolant flows through the coolant inlet into the region below the battery cells. A portion of the fluid stream flows through the cell intermediate channels arranged between the first and/or second battery cells into the region above the battery cells, wherein the other portion of the coolant can flow first below the first battery cells and then below the second battery cells. The flow of coolant above the battery cells can be deflected by the deflector element and then flows through one of the passage openings to the opposite side of the deflector element. Here, the coolant can cool the region above the battery cells before the coolant stream from above and below the battery cells can flow out through the coolant outlet.

According to an advantageous configuration of the method described above, it is provided that the coolant flows in a U-shaped manner around the deflector element. The U-shaped path allows the power bus to be cooled in a targeted manner with as little component cost as possible.

According to an advantageous configuration of the method presented above, it is provided that the flow is directed from the coolant inlet to the coolant outlet. The battery device has a main flow direction, wherein the coolant can be introduced through the coolant inlet and can flow out by the coolant inlet. The flow direction within the housing wall can vary due to the apparatuses.

Alternatively or in addition to the advantageous configurations described above, the method can use advantageous features and configurations that have been described in connection with the battery device according to aspects of the invention alone or in combination.

BRIEF DESCRIPTION OF THE DRAWINGS

Further details and advantages of the invention will be explained in the following with reference to the embodiment examples shown in the drawings. Here.

DETAILED DESCRIPTION OF THE INVENTION

Figure 1:
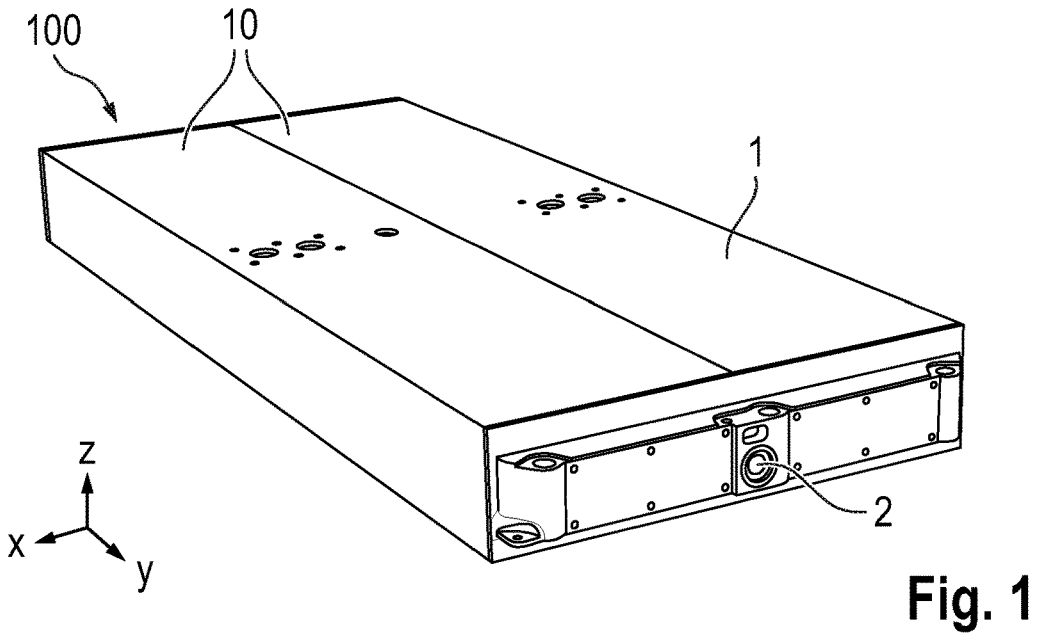
FIG. 1 shows an embodiment example of a battery housing according to the invention, having a coolant inlet in a perspective view.

FIG. 1 shows an embodiment example of a battery device 100 according to aspects of the invention for a motor vehicle, in particular an electric motor vehicle, for cooling the elements arranged within the battery housing 1. In the exemplary illustration in FIG. 1, the battery housing 100 comprises two battery modules 10, wherein each battery module 10 comprises several battery cells 11. Furthermore, a coolant inlet 2 allows a coolant to be introduced into the battery device 100.

Figure 2:
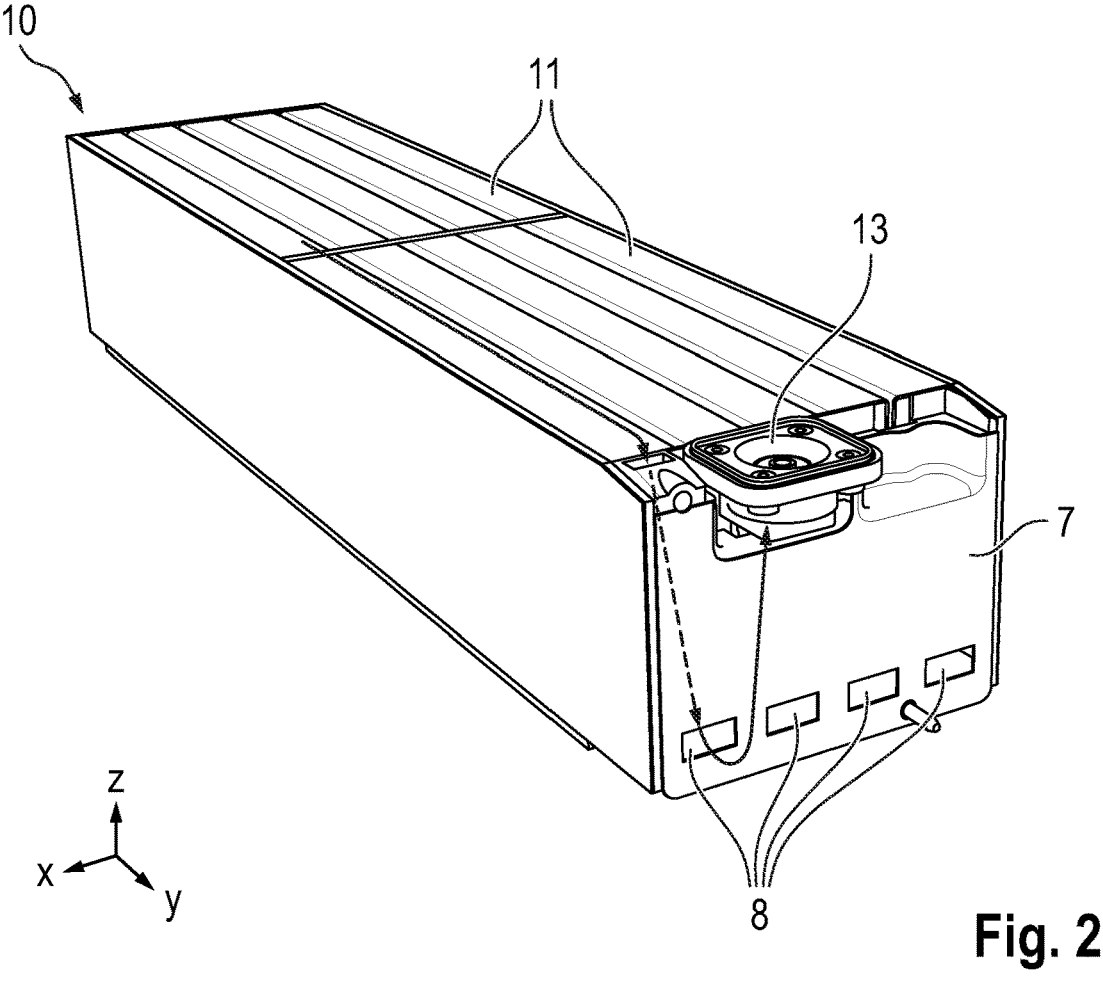
FIG. 2 shows a perspective, cut view of a part of the interior of the battery housing with a deflector element.

FIG. 2 shows a battery module 10 that can be used with the battery device 1 shown in FIG. 1 in a perspective cross-sectional view. The battery module 10 comprises several battery cells 11, a deflector element 7 having several passage openings 8, and an electrical connecting region 13. The deflector element 7 is arranged perpendicular to a flow direction of a coolant indicated by arrows in FIG. 2 within the battery module in such a way that the coolant is deflected by the deflector element 7 in a U shape.

The flowable coolant for cooling the battery cells 11 within the battery module 10 is a dielectric fluid. This coolant is guided in a free region above the battery cells 11 towards the deflector element 7. Here, the coolant is deflected perpendicularly downward through the deflector element 7 and guided through the passage openings 8 of the deflector element 7. After passing through the passage openings 8, the coolant is directed upwards again on the other side. Thus, a U-shaped curve is produced. Furthermore, the passage openings 8 have a polygonal cross-section. In addition, the passage openings 8 are arranged at an identical distance from the upper and lower side of the deflector element 7, i.e. at a common height. To optimally redirect the flow of coolant through the deflector element 7, the deflector element is sealed upward and/or downward against an inner wall of the battery housing 100.

Figure 3:
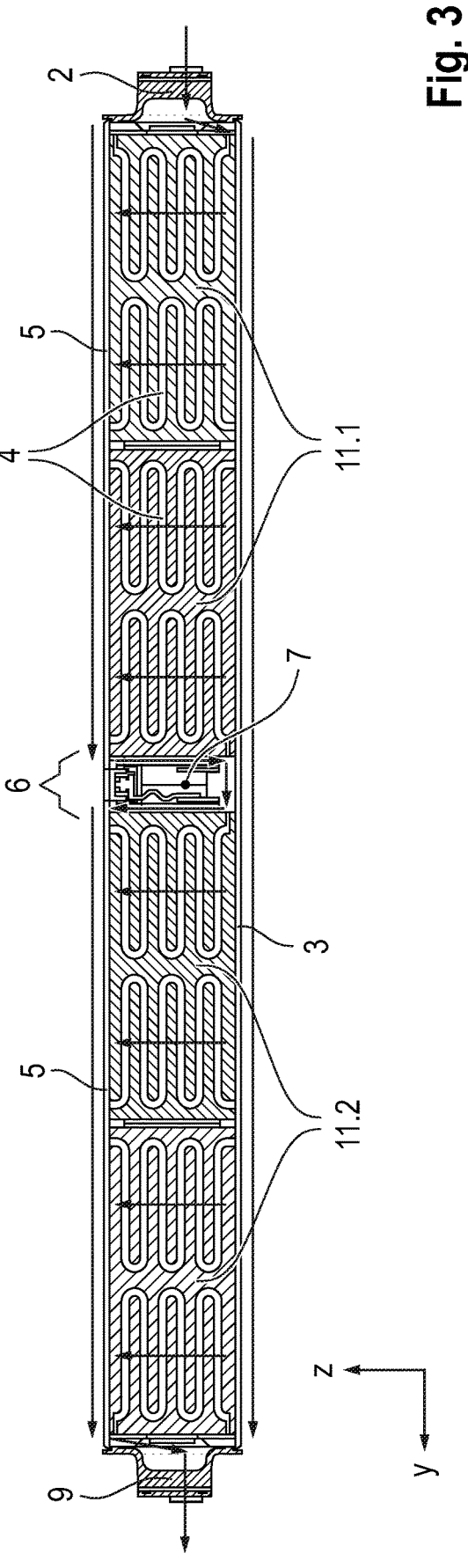
FIG. 3 shows an embodiment example of a battery device according to aspects of the invention with a deflector element in a cut view.

The flow path of the coolant through the battery module 10 can be understood based on the illustration in FIG. 3. The coolant can be introduced at the coolant inlet 2 at a desired pressure generated by a conveyor device (not shown), in particular outside of the battery module 10. Through the coolant inlet 2, the coolant flows into a free region 3 below the battery cells 11.

A battery module 10 in the illustration of FIG. 3 comprises several battery cells 11, wherein the battery cells 11 arranged on a first side of the deflector element 7 are referred to as first battery cells 11.1 and the battery cells 11 arranged on the opposite side of the deflector element 7 are referred to as second battery cells 11.2. According to FIG. 3, the first battery cells 11.1 are arranged closer to the coolant inlet 2 than the second battery cells 11.2. Between two of the first battery cells 11.1 and between two of the second battery cells 11.2, there are respective cell intermediate channels 4, for example in a meandering fashion. The coolant passes upwards through the cell intermediate channels 4 starting from the free regions 3 below the first battery cells 11.1 and second battery cells 11.2, respectively.

In this respect, a cell intermediate channel 4 connects the free region 3 below the battery cells 11 to the free region 5 above the battery cells 11. The flow direction of the coolant is directed from the coolant inlet 2 to a coolant outlet 9 arranged on the opposite side of the battery housing 1.

Figure 4:
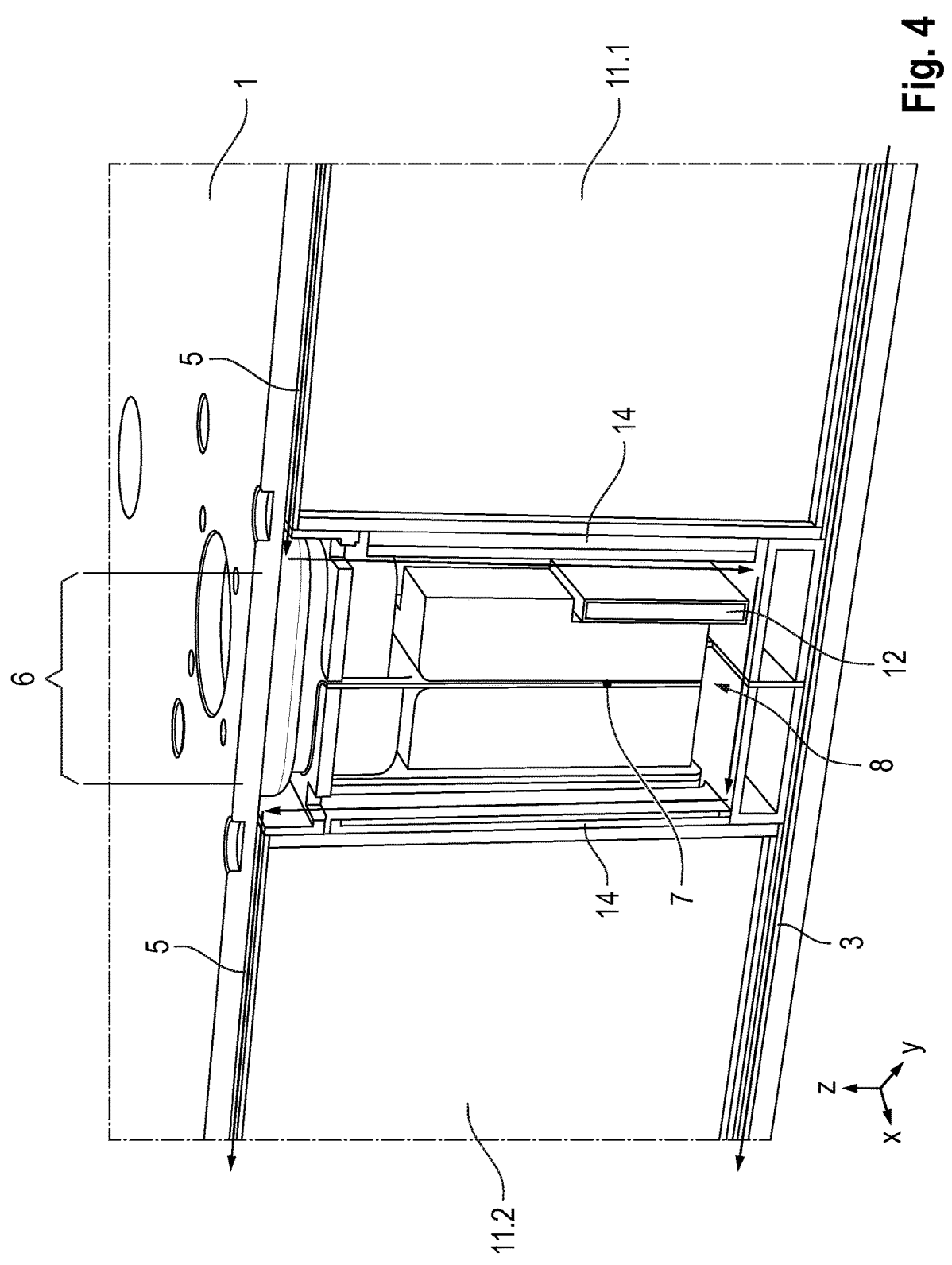
FIG. 4 shows a detailed view of a deflector element according to aspects of the invention according to FIG. 2 and FIG. 3.

In FIG. 4, the intermediate space 6 between the first battery cells 11.1 and the second battery cells 11.2 is shown in detail. The intermediate space 6 comprises the deflector element 7, a power bus 12, and an electrical connecting region for battery cells 14. The flow of coolant from the free region above the battery cells 5 is diverted perpendicularly downward by the deflector element 7 so that the flow of coolant flows along the power bus 12 and is then directed through the passage openings 8 of the deflector element 7. Here, the passage openings 8 are arranged in a region below the power bus 12 so that all of the deflected coolant can flow around the power bus 12. The U-shaped flow path around the deflector element 7 can be seen in FIG. 4. Due to the deflector element 7, the flow direction of the coolant in the free region 5 above the battery cells 11 can thus deviate from the flow direction of the coolant in the free region 3 below the battery cells 11.

REFERENCE NUMBERS

1—Battery housing
2—Coolant inlet
3—Free region below the battery cells
4—Cell intermediate channel
5—Free region above the battery cells
6—Intermediate space
7—Deflector element
8—Passage opening
9—Coolant outlet
11—Battery cell
11.1—First battery cell
11.2—Second battery cell
12—Power bus
13—Electrical connecting region of battery housing
14—Electrical connecting region of battery cell
100—Battery device

What is claimed is:

1. A battery device for an electric motor vehicle, said battery device comprising:
   a battery housing defining an interior;
   at least two battery cells and a power bus, which are each arranged in the interior of the battery housing and are configured to be temperature-controlled by a flowable coolant contained in the interior;
   a deflector element arranged between the battery cells; and
   an intermediate space disposed within the interior at a location between the battery cells,
   wherein the power bus, the flowable coolant, electrical connections on the at least two battery cells, and the deflector element are each arranged in the intermediate space,
   wherein the deflector element is arranged in the intermediate space such that the deflector element divides the intermediate space into a first subspace in which the power bus and the electrical connections of a first battery cell of the at least two battery cells are positioned and a second subspace in which the electrical connections of a second battery cell of the at least two battery cells are positioned, wherein the deflector element comprises at least one passage opening for the coolant, wherein the at least one passage opening is arranged such that coolant flowing in the first subspace is urged to flow along and in direct contact with the power bus before passing through the at least one passage opening and into the second subspace.

2. The battery device according to claim 1, further comprising a perfusable free region for the flowable coolant arranged both below and above the battery cells.

3. The battery device according to claim 1, wherein the deflector element is arranged to define a U-shaped flow path of the coolant in the intermediate space and around the power bus.

4. The battery device according to claim 1, wherein the deflector element comprises a plurality of passage openings, wherein all of the passage openings are arranged at a common distance from a top of the deflector element.

5. The battery device according to claim 1, wherein the passage opening has a cross-section that is circular, elliptical, polygonal, or quadrilateral.

6. The battery device according to claim 1, wherein the coolant is guided above the battery cells in a first flow direction, wherein the deflector element is arranged perpendicular to the first flow direction; and/or wherein the coolant is guided below the battery cells in a second flow direction, wherein the deflector element is arranged perpendicular to the second flow direction.

7. The battery device according to claim 1, wherein the power bus electrically connects the at least two battery cells to one another.

8. The battery device according to claim 1, wherein the deflector element is sealed against an inner wall and the battery housing.

9. The battery device according to claim 1, wherein the battery housing comprises at least one coolant inlet and one coolant outlet that are arranged on opposite sides of the battery device.

10. The battery device according to claim 1, further comprising a conveyor device for conveying the coolant in a flow direction.

11. The battery device according to claim 1, wherein the first battery cell of the at least two battery cells is arranged to face a first side of the deflector element, and the second battery cell of the at least two battery cells is arranged to face a second side of the deflector element that is opposite the first side.

12. The battery device according to claim 11, wherein the battery device comprises at least two first battery cells and/or at least two second battery cells, wherein a cell intermediate channel is arranged between the two first battery cells and the two second battery cells, which cell intermediate channel connects a perfusable free region below the respective battery cells to a perfusable free region above the battery cells.

13. The battery device according to claim 1, wherein the coolant is a dielectric fluid.

14. An electric motor vehicle comprising the battery device of claim 1.

15. A method for operating a battery device of an electric motor vehicle having a battery housing defining an interior, at least two battery cells and a power bus, which are each arranged in the interior of the battery housing and are configured to be temperature-controlled by a flowable coolant contained in the interior; a deflector element arranged between the battery cells; and an intermediate space disposed within the interior at a location between the battery cells, wherein the power bus, the flowable coolant, electrical connections on the at least two battery cells, and the deflector element are each arranged in the intermediate space, wherein the deflector element is arranged in the intermediate space such that the deflector element divides the intermediate space into a first subspace in which the power bus and the electrical connections of a first battery cell of the at least two battery cells are positioned and a second subspace in which the electrical connections of a second battery cell of the at least two battery cells are positioned, wherein the deflector element comprises at least one passage opening for the coolant, wherein the at least one passage opening is arranged such that coolant flowing in the first subspace is urged to flow along and in direct contact with the power bus before passing through the at least one passage opening and into the second subspace, wherein the method comprises the steps of:
      delivering the coolant into the first subspace,
      flowing the coolant along and in direct contact with the power bus,
      after flowing along the power bus, flowing the coolant through the passage opening, and
      flowing the coolant into the second subspace.

16. The method according to claim 15, wherein the flowing steps together comprise flowing the coolant in a U shape around the deflector element.

17. The method according to claim 15, wherein at least the first battery cell of the at least two battery cells is arranged to face a first side of the deflector element, and at least the second battery cell of the at least two battery cells is arranged to face a second side of the deflector element that is opposite the first side, wherein the at least two battery cells comprises at least two of the first battery cells and at least two of the second battery cells, wherein the delivering step comprises flowing coolant (i) through a coolant inlet below the first battery cells and/or the second battery cells and (ii) upwards through at least one cell intermediate channel between the first battery cells and/or the second battery cells and (iii) into the first subspace.

18. The method according to claim 17, wherein the method comprises directing the coolant flow from the coolant inlet to the coolant outlet.

19. The battery device according to claim 1, wherein the busbar partially blocks the opening.

20. The battery device according to claim 1, wherein the deflector element is sealed against an inner wall that runs perpendicular to the deflector element, wherein the inner wall is disposed between the battery cells, wherein the inner wall includes a first opening through which the coolant is delivered into the intermediate space and a second opening through which the coolant is expelled from the intermediate space, and wherein the first opening is positioned to deliver the coolant in a space disposed between the power bus and the first battery cell.

* * * * *